(12) United States Patent
Asai

(10) Patent No.: US 7,192,075 B1
(45) Date of Patent: Mar. 20, 2007

(54) SUN VISOR FOR VEHICLE AND METHOD OF MANUFACTURING THE SAME

(75) Inventor: Takashi Asai, Toyota (JP)

(73) Assignees: Kyowa Sangyo Co., Ltd., Aichi-Ken (JP); Shinwa Seiko Co., Ltd., Aichi-Ken (JP)

( * ) Notice: Subject to any disclaimer, the term of this patent is extended or adjusted under 35 U.S.C. 154(b) by 0 days.

(21) Appl. No.: 10/550,402

(22) PCT Filed: Mar. 22, 2004

(86) PCT No.: PCT/JP2004/003890

§ 371 (c)(1),
(2), (4) Date: Sep. 21, 2005

(87) PCT Pub. No.: WO2004/085183

PCT Pub. Date: Oct. 7, 2004

(30) Foreign Application Priority Data

Mar. 26, 2003  (JP) ............................ 2003-085473

(51) Int. Cl.
*B60J 3/00* (2006.01)

(52) U.S. Cl. .................................... 296/97.1; 296/97.2

(58) Field of Classification Search ............... 296/97.1, 296/97.2
See application file for complete search history.

(56) References Cited

U.S. PATENT DOCUMENTS

| | | | | |
|---|---|---|---|---|
| 4,163,579 A | * | 8/1979 | Mahler et al. | 296/97.1 |
| 4,227,241 A | * | 10/1980 | Marcus | 296/97.5 |
| 4,275,916 A | * | 6/1981 | Skogler | 296/97.5 |
| 4,477,116 A | * | 10/1984 | Viertel et al. | 296/97.1 |
| 4,576,409 A | * | 3/1986 | Ebert | 296/97.1 |
| 4,763,946 A | * | 8/1988 | Robbins et al. | 296/97.1 |
| 4,858,983 A | * | 8/1989 | White et al. | 296/97.1 |
| 5,205,639 A | * | 4/1993 | White et al. | 296/97.2 |
| RE34,333 E | * | 8/1993 | Boerema et al. | 297/227 |
| 5,556,154 A | * | 9/1996 | Vaxelaire | 296/97.1 |
| 5,887,933 A | * | 3/1999 | Peterson | 296/97.1 |
| 6,131,985 A | * | 10/2000 | Twietmeyer et al. | 296/97.1 |
| 6,499,868 B1 | * | 12/2002 | Kerul, Jr. | 362/492 |
| 6,634,696 B1 | * | 10/2003 | Tiesler | 296/97.1 |
| 6,641,197 B1 | * | 11/2003 | Hobson et al. | 296/97.1 |
| 6,669,262 B1 | * | 12/2003 | Crotty et al. | 296/97.1 |
| 6,840,561 B2 | * | 1/2005 | Mills et al. | 296/97.1 |

* cited by examiner

*Primary Examiner*—Kiran B. Patel
(74) *Attorney, Agent, or Firm*—Conley Rose, P.C.

(57) ABSTRACT

The present invention relates to a sun visor for a vehicle and a method of manufacturing the sun visor. The structure of the sun visor is complicated and the cost thereof is increased when an elastically compressive elastic body is installed between both first and second core split bodies of a core body to prevent the wrinkles from occurring in the vicinity of the corner fused parts of the skins. In view of the above problem, an object of the present invention is to prevent wrinkles from occurring near the corner fused parts of skins with a relatively simple structure. In the present invention, a corner tension part, for preventing the displacement of the corner fused part toward the corner part of the core body, is disposed between the corner part of the core body and the core fused part of the skins. Thus, the displacement of the corner fused part of the skins toward the corner parts of the core body can be prevented by the corner tension part, thereby preventing the wrinkles from occurring in the corner fused part of the skins or in the vicinity thereof.

6 Claims, 10 Drawing Sheets

SUN VISOR FOR VEHICLE AND METHOD OF MANUFACTURING THE SAME

TECHNICAL FIELD

The present invention relates to a sun visor for a vehicle and a method of manufacturing the same.

BACKGROUND ART

A sun visor for a vehicle exists in which a core body is covered with skins fused together along the peripheral edge portion of the core body to thereby form the sun visor main body.

A core body and skin materials, which skin materials extend along both the front and back surfaces of the core body and have a large enough size to protrude beyond the peripheral edge of the core body by a predetermined amount so as to overlap each other, are interposed between a pair of fusing molds. Subsequently, the sun visor main body is manufactured by fusing the overlapping parts of the skin materials to each other along the outer peripheral edge of the core body.

In the sun visor main body manufactured as described above, a clearance, which is appropriately larger than the thickness dimension of the skin materials, is set between the pair of fusing molds and the core body. Thus, when the pair of fusing molds are clamped in order to fuse together the overlapping portions of the skin materials along the outer peripheral edge of the core body, the corner fused parts of the skins may be displaced toward the corner parts of the core body. As a result of this displacement, wrinkles may appear on the skin surface in the corner fused parts of the skins or in the vicinity thereof.

In order to prevent the above-mentioned problem, for example, a sun visor for a vehicle is provided in which the core body is composed of first and second core split bodies. An elastically compressible elastic body is interposed between the first and second core split bodies.

The first and second core split bodies, the elastic body, and the skin materials, are all arranged between a pair of fusing molds in a predetermined order.

Thereafter, in the known sun visor for a vehicle and the method of manufacturing the same, clamping the pair of fusing molds together fuses the skin materials to each other while elastically compressing the elastic body. The elastic opposing force due to the elastic compression of the elastic body prevents the appearance of wrinkles on the skin surface (See, for example, JP 2002-316535 A).

Incidentally, when the core body is composed of a first and second core split bodies and the elastically compressible elastic body is installed between the first and second core split bodies, this results in a relatively complicated construction and high cost.

In view of the above-mentioned problem, it is an object of the present invention to provide a sun visor for a vehicle with a relatively simple construction and a method of manufacturing the same, which prevents the appearance of wrinkles in the corner fused parts of the skin surface or in the vicinity thereof.

DISCLOSURE OF THE INVENTION

A sun visor for a vehicle according to a first aspect of the invention includes a sun visor main body that is constructed by covering a core body with skins fused together along a peripheral edge portion of the core body. A corner tension part for preventing displacement of the corner fused part toward the corner part of the core body is provided between corner part of the core body and corner fused part of the skins.

Thus, displacement of the corner fused part of the skins toward the corner part of the core body is prevented by the corner tension part, thereby preventing the formation of wrinkles in the corner fused part of the skins or in the vicinity thereof.

A method of manufacturing a sun visor for a vehicle according to a second aspect of the invention includes a sun visor main body that is constructed by covering a core body with skins fused together along a peripheral edge portion of the core body. The core body and skin materials extending along front and back surfaces of the core body, which skin materials are large enough to protrude by a predetermined amount beyond the peripheral edge of the core body so as to overlap each other, are set between a pair of fusing molds. Also included between the pair of fusing molds is a corner tension part forming material. The corner tension part forming material is formed of the same material as the skin materials or a thermoplastic resin having compatibility with the material of the skin materials and is arranged between the corner part of the core body and overlapping portions of the skin materials corresponding to the corner fused part of the skins. Thereafter, the overlapping portions of the skin materials are fused to each other, with the corner tension part forming material being held between the overlapping portions of the skin materials along an outer peripheral edge of the core body.

Thus, the overlapping portions of the skin materials are fused to each other along the outer peripheral edge of the core body, with the corner tension part forming material there between. Whereby the skin materials form the skin surface covering the core body, and the corner tension forming material form the corner tension part. Consequently, it is possible to prevent displacement of the corner fused part of the skins toward the corner part of the core body due to the corner tension part.

That is, by the method of manufacturing a sun visor for a vehicle according to the second aspect of the invention, it is possible to easily manufacture the sun visor for a vehicle according to the first aspect of the invention.

In a method of manufacturing a sun visor for a vehicle according to a third aspect of the invention, the core body of the second aspect of the invention is composed of a first core split body and a second core split body divided along the thickness direction of the core body. A part of the corner tension part forming material is then held between the first core split body and the second core split body.

As a result, by holding a part of the corner tension part forming material between the first core split body and the second core split body, it is possible to prevent the corner tension part forming materials from being inadvertently displaced. It is consequently possible to form the corner tension part in a satisfactory manner from the corner tension part forming material, making it possible to more satisfactorily prevent wrinkles from forming in the corner fused part of the skins and in the vicinity thereof.

In a method of manufacturing a sun visor for a vehicle according to a fourth aspect of the invention, the skins of the third embodiment are formed by a first skin material and a second skin material consisting of fusible sheet materials of a large enough size to protrude by a predetermined amount beyond the peripheral edge of the core body, so as to overlap with each other. Further, the end portions of at least one of the first or second skin materials may be folded in order to constitute the corner tension part forming material, which is then held between the first and second core split bodies.

As a result, it is possible to form the corner tension part forming material from folded pieces of the end portions of the skin materials. It is therefore possible to reduce the work and effort otherwise required to prepare dedicated corner tension part forming material separately from the skin materials. Thereby, the cost can be made relatively lower.

BRIEF DESCRIPTION OF THE DRAWINGS

FIG. 7 is an explanatory view showing how the first fusing mold and the second fusing mold are clamped together, fusing the first and second skin materials to each other along the peripheral edge portion of the core member, with the corner tension part forming materials being positioned there between.

FIG. 9 is an explanatory view showing how the first fusing mold and the second fusing mold are clamped together, fusing the first and second skin materials to each other along the peripheral edge portion of the core body, with the corner tension part forming materials being positioned there between.

FIG. 11 is an explanatory view showing how the first fusing mold and the second fusing mold are clamped together, fusing the first and second skin materials to each other along the peripheral edge portion of the core body, with the corner tension part forming materials being positioned there between.

FIG. 13 is an explanatory view showing how the first fusing mold and the second fusing mold are clamped together, fusing the first and second skin materials to each other along the peripheral edge portion of the core body, with the corner tension part forming materials being positioned there between.

BEST MODE FOR CARRYING OUT THE INVENTION

Embodiment 1

Embodiment 1 of the present invention will be described with reference to FIGS. 1 through 7.

Figure 1:
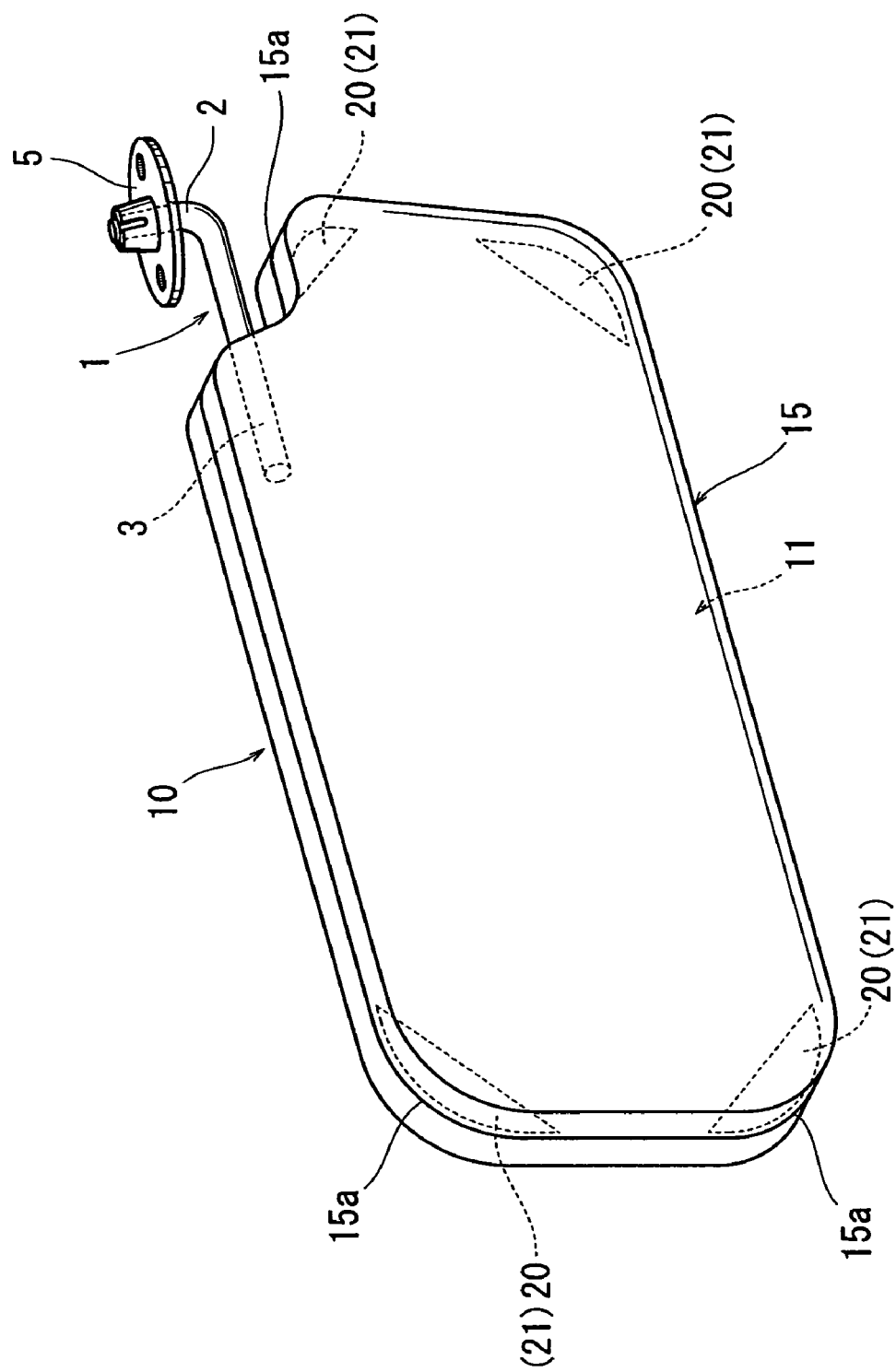
FIG. 1 is a perspective view showing a sun visor for a vehicle according to Embodiment 1 of the present invention.
Figure 2:
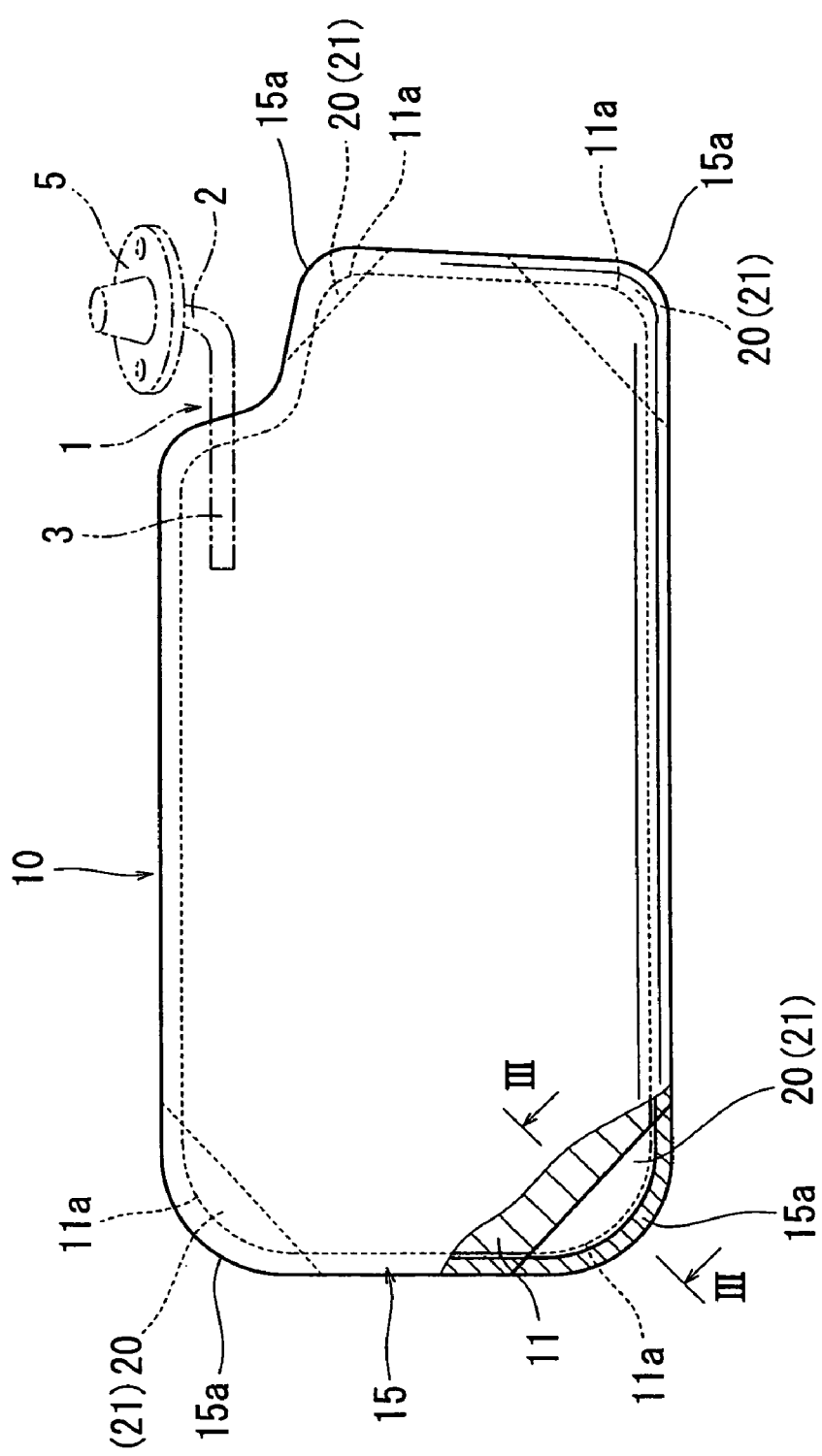
FIG. 2 is a partially cutaway front view of the sun visor main body of a sun visor for a vehicle.
Figure 3:
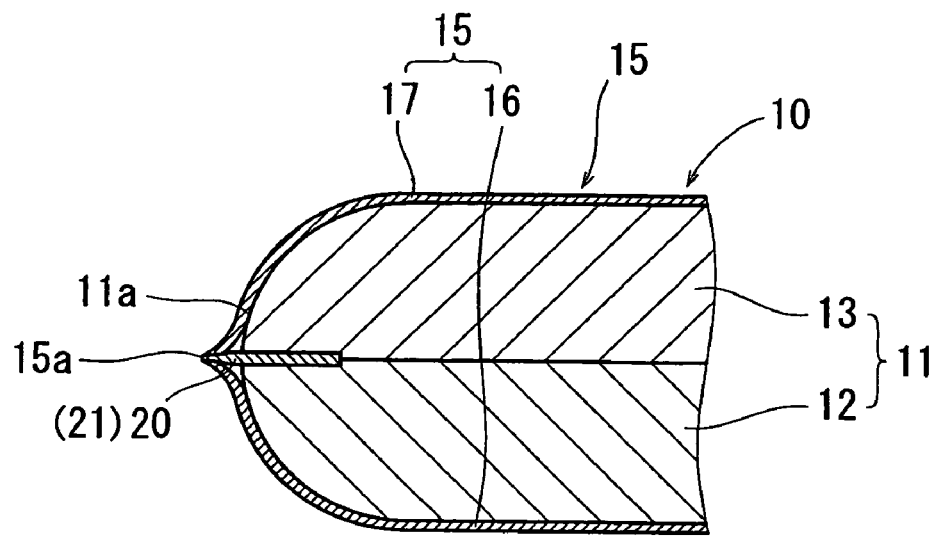
FIG. 3 is a cross-sectional view taken along the line III—III of FIG. 2, showing a corner part of the sun visor main body.

In FIG. 1, which is a perspective view showing a sun visor for a vehicle, in FIG. 2, which is a partially cutaway front view of the main body of the sun visor, and in FIG. 3, which is a sectional view taken along the line III—III of FIG. 2, a sun visor for a vehicle is equipped with a support shaft 1 and a sun visor main body 10.

The support shaft 1 has a vertical shaft portion 2 and a horizontal shaft portion 3, and is formed in a substantially L-shaped configuration. The vertical shaft portion 2 thereof is attached to the ceiling surface of the vehicle by a mounting bracket 5.

A core body 11, covered with a skin 15, forms the sun visor main body 10. The sun visor main body 10 is attached so as to be rotatable around the horizontal shaft portion 3 of the support shaft 1.

As shown in FIG. 3, in Embodiment 1, the core body 11 is formed as a plate with a predetermined configuration by connecting together, in a manner like joined palms, a first core split body 12 and a second core split body 13, divided into two in the thickness direction thereof. Further, the first and second core split bodies 12 and 13 may be formed, for example, from foaming beads of polypropylene, or as hollow half-shell-shaped members by injection molding of a synthetic resin material.

At a predetermined position of the interior of the core body 11, there is formed a bearing portion having a bearing hole. The horizontal shaft portion 3 of the support shaft 1 is rotatably inserted into the bearing hole.

As shown in FIG. 3, fusing a first skin material 16 and a second skin material 17 to each other along the peripheral edge portion of the core body 11 forms the skin 15. Each of the first and second skin materials 16 and 17 is of a large enough size to protrude by a predetermined amount beyond the peripheral edge of the core body 11. The protruding skin portions 18, outwardly protruding from the fused portion (See FIG. 7), is then cut away. Consequently, covering the entire core body 11 with the skin 15 forms the sun visor main body 10.

In Embodiment 1, in the corner parts 11a of the core body 11, corner strut parts or corner tension parts 20 are respectively provided for preventing the displacement of the corner fused parts 15a towards the corner parts 11a of the corner body 11. Corner tension parts 20 are respectively provided between each of the corner parts 11a in the four corners of the core body 11 and between each of the corner fused parts 15a of the skin 15 opposed thereto.

Corner tension part forming materials 21 forms each of the corner tension parts 20. The corner tension part forming materials 21 consist of sheet materials or plate materials of a thermoplastic resin. These materials are the same materials as the first and second skin materials 16 or have compatibility with the materials of the first and second skin materials.

That is, the base side portions of the corner tension part forming materials 21 (formed substantially in a triangular configuration) are held between the first and second core split bodies 12 and 13 (See FIGS. 5 and 6) before both first and second skin materials 16 and 17 are fused to each other along the peripheral edge portion of the core body 11. The overlapping portions of the first and second skin materials 16 and 17 are then fused to be bonded to each other along the outer peripheral edge of the core body 11 with the corner tension part forming materials 21 therebetween. The protruding portions 22 of the corner tension part forming materials 21 are subsequently cut away together with the protruding skin portions 18 protruding outwardly from the fused portions. As a result, the sun visor main body 10 is formed (See FIG. 7).

In the sun visor main body 10 of the sun visor for a vehicle according to Embodiment 1, constructed as described above, the corner tension parts 20 are respectively provided between the corner parts 11a in the four corners of the core body 11 and the corner fused parts 15a of the skin 15 opposed thereto. Further, by using the corner tension parts 20, it is possible to prevent displacement of the corner fused parts 15a of the skin 15 toward the corner parts 11a of the core body 11.

Due to this construction, it is possible to prevent wrinkles from forming in the corner fused parts 15a of the skin 15 or in the vicinity thereof. As a result, making it possible to provide a sun visor main body 10 with a superior appearance having no wrinkles in the corner fused parts 15a or in the vicinity thereof.

A method of manufacturing a sun visor for a vehicle according to Embodiment 1 described above will be explained next with reference to FIGS. 4 through 7.

First, the core body 11 is prepared, which is formed by connecting the first core split body 12 and the second core split body 13 together, in a manner like joined palms.

In addition, the first and second skin materials 16 are formed and prepared. The first and second skin materials consist of fusible sheet materials having a large enough size to protrude by a predetermined amount beyond the peripheral edge of the core body 11 so as to overlap with each other. The corner tension part forming materials 21 are also formed and prepared. The corner tension part forming materials 21 consist of sheet materials or plate materials of a thermoplastic resin that is the same as the first and second skin materials 16 and 17 or has compatibility with the material of the first and second skin materials 16. The corner tension part forming materials 21 are prepared with a substantially triangular configuration by using sheet materials or plate materials of a thermoplastic resin that is the same as or has compatibility with the material of the first and second skin materials.

Figure 5:
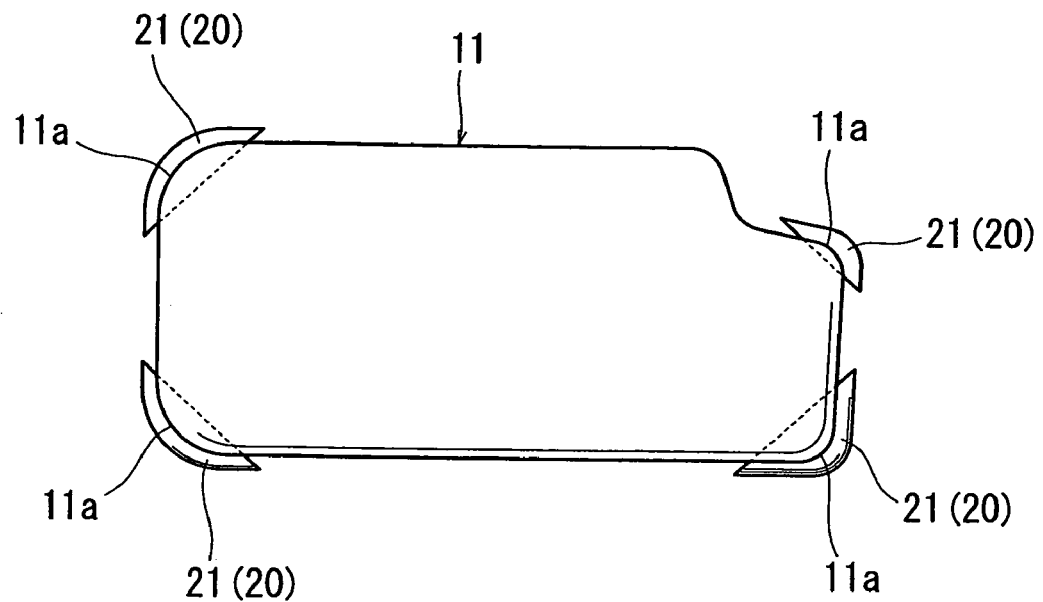
FIG. 5 is a front view showing how corner tension part forming materials are arranged at the corner parts of the core body.
Figure 6:
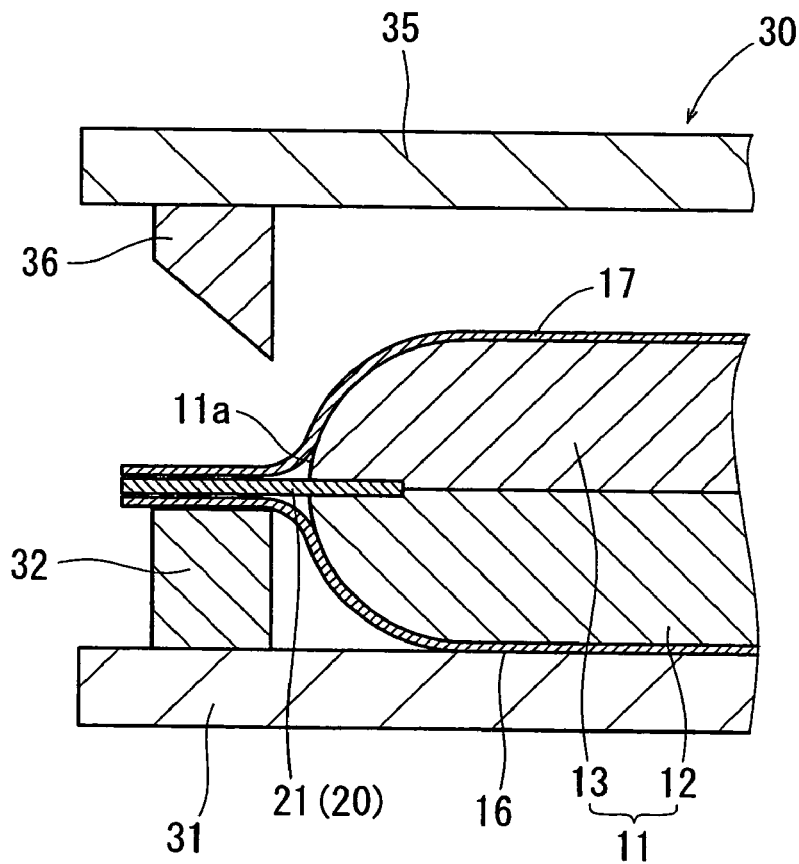
FIG. 6 is a cross-sectional view of a corner part, showing how the first and second core split bodies, the first and second skin materials, and the corner tension part forming materials are set on the first fusing mold of the fusing mold device.

As shown in FIGS. 5 and 6, the base side portions of the corner tension part forming materials 21 are then clamped and held between the first and second core split bodies 12 and 13 at the corner parts 11a of the core body 11.

When connecting the first and second core split bodies 12 and 13 in a form like joined palms, the corner tension part forming materials 21 can be easily held between the first and second core split bodies 12 and 13.

However, it is also possible to initially connect the first and second core split bodies 12 and 13 to each other in a manner like joined palms prior to inserting the corner tension part forming materials 21 into the gap between the first and second core split bodies 12 and 13. Starting with the base side portions of corner tension part forming materials 21, inserting a predetermined amount of the base side portions can hold the corner tension part forming materials 21 between the first and second core split bodies 12 and 13.

Figure 4:
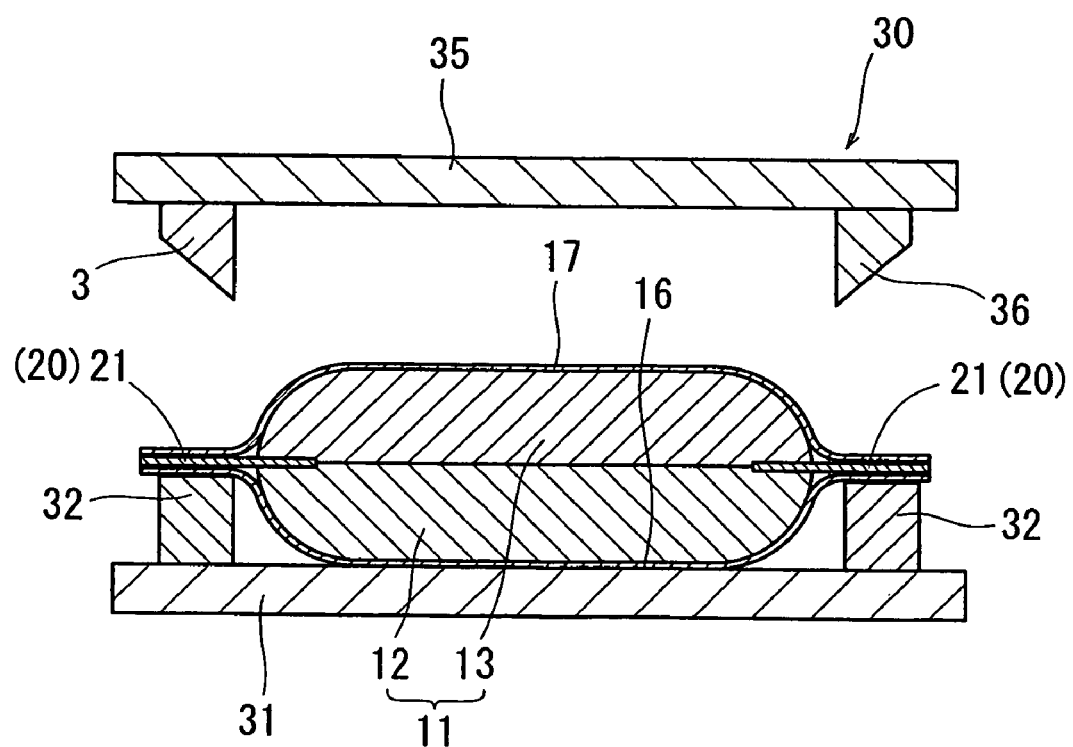
FIG. 4 is an explanatory view showing how the first and second core split bodies and the first and second skin materials are set in a first fusing mold of a fusing mold device.

As shown in FIGS. 4 and 6, the first and second skin materials 16 and 17, the core body 11, and the tension part forming materials 21, are then set in a predetermined order between a first fusing mold 31 and a second fusing mold 35. The first and second fusing molds 31 and 35 constitute a pair of lower and upper molds of a fusing mold device 30 (e.g., a high-frequency fusing type device, an ultrasonic fusing type device, a heater heating-fusing type device, or the like).

In Embodiment 1, the first skin material 16, the core body 11, the tension part forming materials 21, and the second skin material 17, are layered and set in this order on the mold surface of the first, lower fusing mold 31 of the first and second fusing molds 31 and 35 configured in an open state.

Figure 7:
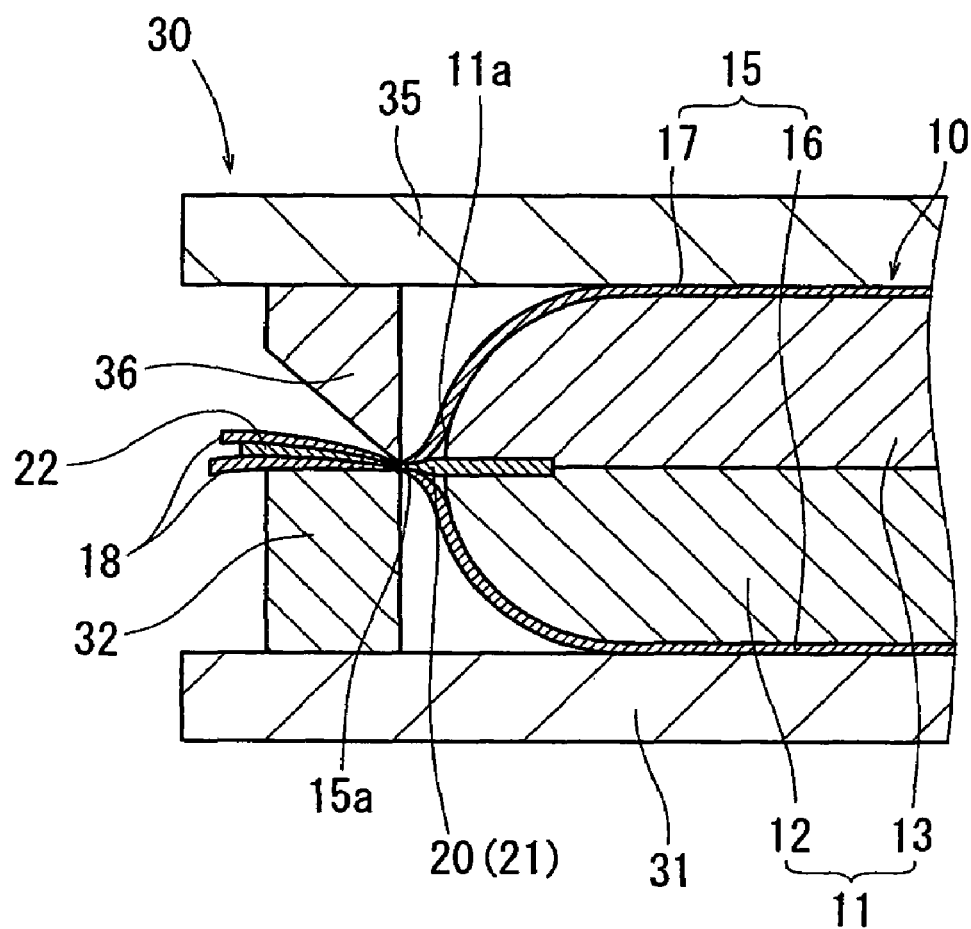

Here, as shown in FIG. 7, the second fusing mold 35 is lowered with respect to the first fusing mold 31 so as to implement clamping. As a result, the overlapping portions of the first and second skin materials 16 and 17 are fused and bonded to each other along the outer peripheral edge of the core body 11, with the corner tension part forming materials 21 being arranged therebetween, by means of a fusing cutter 36 and a cutter receiving portion 32 provided on the first and second fusing molds 31 and 35. In this process, protruding portions 22 of the corner tension part forming materials 21 are cut away together with protruding skin portions 18 protruding outwardly from the fused portions.

The first and second skin materials 16 and 17 form the skin 15 covering the core body 11. Additionally, the corner tension parts 20 are formed by the corner tension part forming materials 21. As a result, the sun visor main body 10 is formed (manufactured).

Thereafter, the second fusing mold 35 is raised to the former open mold position with respect to the first fusing mold 31. The sun visor main body 10 is then released from the mold. As a result, one manufacturing cycle for the sun visor main body 10 is completed.

As stated above, after manufacturing the sun visor main body 10, the horizontal shaft portion 3 of the support shaft 1 is inserted into the bearing portion of the sun visor main body 10. Thereby, the manufacturing process for the entire sun visor for a vehicle is completed.

As also stated above, in the method of manufacturing a sun visor for a vehicle according to Embodiment 1, the overlapping portions of the first and second skin materials 16 and 17 are fused to be bonded to each other, with the corner tension part forming materials 21 being held therebetween and arranged along the outer peripheral edge of the core body 11. Consequently, the first and second skin materials 16 and 17 form the skin 15 covering the core body 11, and the corner tension part forming materials 21 forms the corner tension parts 20.

It is thus possible to prevent the displacement of the corner fused parts 15a of the skin 15 toward the corner parts 11a of the core body 11, by means of the corner tension parts 20.

As a result, it is also possible to prevent the displacement of the corner fused parts 15a of the skin 15 due to the clearance (gap) set between the first and second fusing molds 31 and 35, and subsequently prevent formation of wrinkles in the corner fused parts 15a of the skin 15 or in the vicinity thereof otherwise due to the displacement.

Further, the core body 11 is composed of a first core split body 12 and a second core split body 13, split in the thickness direction of the core body 11. A part (the base side portions) of the corner tension part forming materials 21 is held between the first and second core split bodies 12 and 13. As a result, it is possible to prevent inadvertent positional deviation of the corner tension part forming materials 21. Therefore, it is also possible to form the corner tension parts 20 in a satisfactory fashion from the corner tension part forming materials 21, making it possible to prevent, still more satisfactorily, wrinkle formation in the corner fused parts 15a of the skin 15 or in the vicinity thereof.

Embodiment 2

Embodiment 2 of the present invention will be described next with reference to FIGS. 8 and 9.

In Embodiment 2, end portions of at least one of the first and second skin materials 16 and 17 (the second skin material 17 in FIG. 8) are turned buck or folded at portions corresponding to the corner parts 11a of the core body 11. The forward end sections of the folded portions are then held between the first and second core split bodies 12 and 13 of the core body 11, thereby forming corner tension part forming materials 121.

Figure 8:
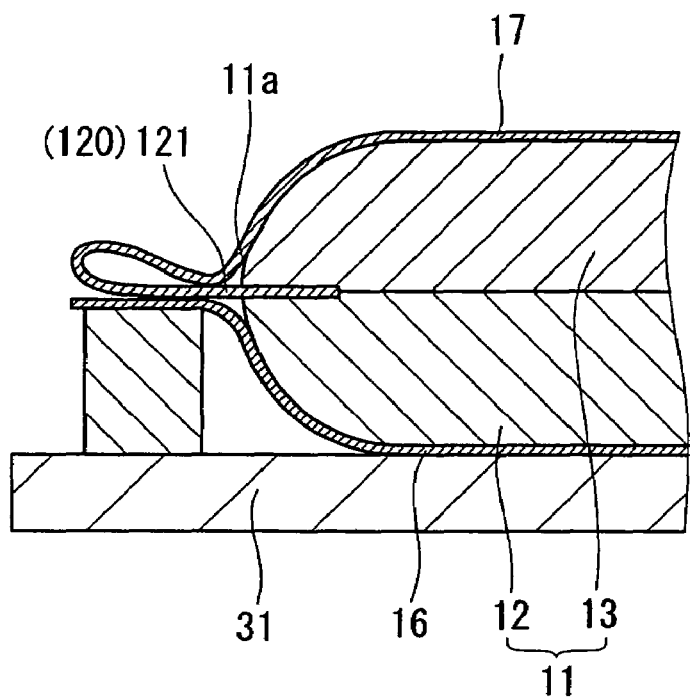
FIG. 8 is an explanatory view illustrating a method of manufacturing a sun visor for a vehicle according to Embodiment 2 of the present invention, showing how the first and second core split bodies, the first and second skin materials, and the corner tension part forming materials, are set in the first fusing mold of the fusing mold device.

Further, as shown in FIG. 8, the first skin material 16, the core body 11, and the second skin material 17 including the tension part forming materials 121, are set on the mold surface of the first, lower fusing mold 31 of the first and second fusing molds 31 and 35 positioned in an open state.

Figure 9:
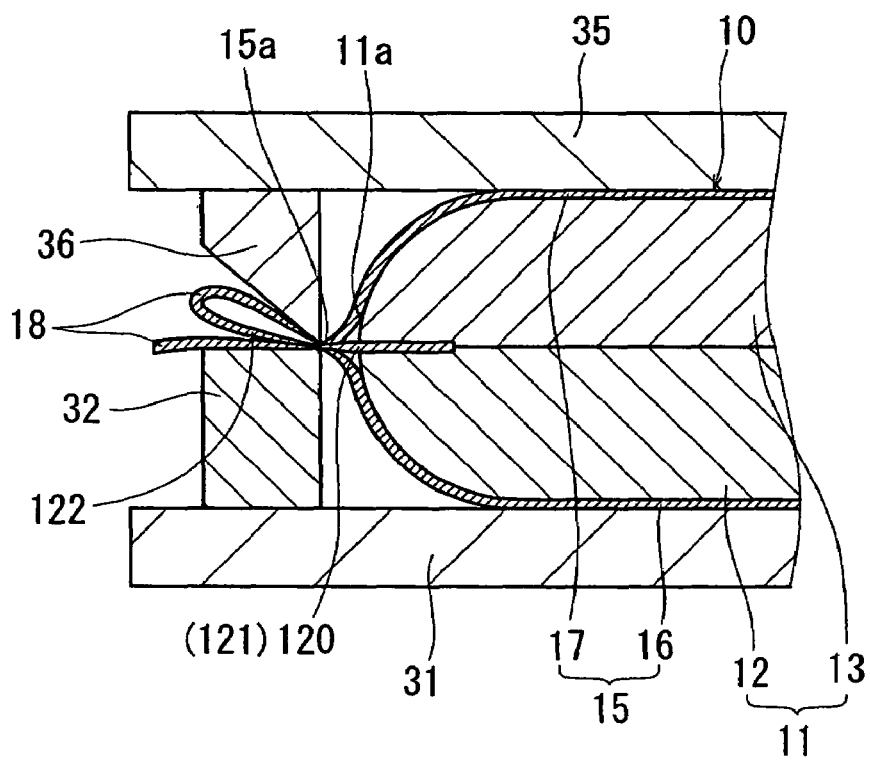

Thereafter, as shown in FIG. 9, the second fusing mold 35 is lowered with respect to the first fusing mold 31 in substantially the same manner as in Embodiment 1. As a result, the overlapping portions of the first and second skin materials 16 and 17 are fused to be bonded each other along the outer peripheral edge of the core body 11 by means of the fusing cutter 36 and the cutter receiving portion 32 of the first and second fusing molds 31 and 35, with the corner tension part forming materials 121 being held between the first and second skin materials 16 and 17. Protruding portions 22 of the corner tension forming materials 121 are then cut away together with the protruding skin portions 18 protruding outwardly from the fused portions. The first and second skin materials 16 and 17 form the skin 15 covering the core body 11. At the same time, the corner tension part forming materials 121 form the corner tension parts 120. As a result, the sun visor main body 10 is formed.

Substantially in the same manner as in Embodiment 1 described above, in Embodiment 2 it is also possible to prevent displacement of the corner fused parts 15a of the skin 15 toward the corner parts 11a of the core body 11 by means of the corner tension parts 120. This makes it possible to prevent the formation of wrinkles in the corner fused parts 15a of the skin 15 or in the vicinity thereof.

In addition, as compared with Embodiment 1 described above, Embodiment 2 advantageously allows omission of the time and effort required to prepare the dedicated corner tension part forming materials 21. Thereby, the cost can be made relatively lower.

Embodiment 3

Embodiment 3 of the present invention will be described next with reference to FIGS. 10 and 11.

In Embodiment 3, at the portions corresponding to the corner parts 11a of the core body 11, there are corner tension part forming materials 221 arranged along the outer peripheral end surfaces of the core body 11. The corner tension part forming materials 221 consist of sheet materials or plate materials formed of the same material as, or a thermoplastic resin having compatibility with, the material of the first and second skin materials 16.

Figure 10:
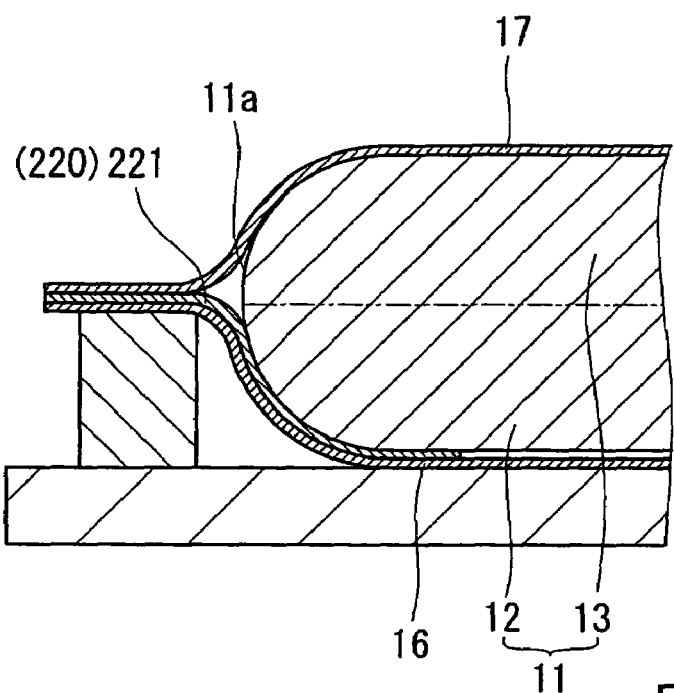
FIG. 10 is an explanatory view illustrating a method of manufacturing a sun visor for a vehicle according to Embodiment 3 of the present invention, showing how the first and second core split bodies, the first and second skin materials, and the corner tension part forming materials, are set on the first fusing mold of the fusing mold device.

That is, as shown in FIG. 10, the first skin material 16, the tension part forming materials 221, the core body 11, and the second skin material 17, are set on the mold surface of the first, lower fusing mold 31 of the first and second fusing molds 31 and 35 positioned in an open state. In this process it is desirable to temporarily fix the corner tension part forming materials 221 to the outer peripheral end surfaces of the core body 11 or to the first skin material 16, or to secure the corner tension part forming materials 221 in position by set pins or the like of the first fusing mold 31, in order that there may be no positional deviation of the corner tension part forming materials 221 along the outer peripheral end surfaces of the core body 11.

Figure 11:
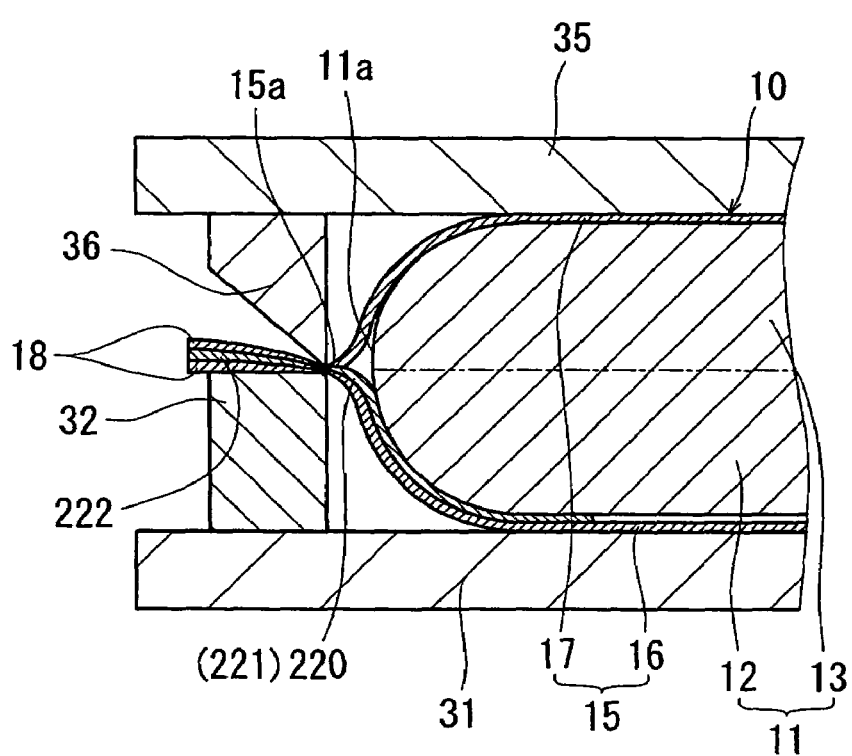

Thereafter, as shown in FIG. 11, the second fusing mold 35 is lowered with respect to the first fusing mold 31 in substantially the same manner as in Embodiment 1. As a result, the overlapping portions of the first and second skin materials 16 and 17 are fused and bonded to each other by means of the fusing cutter 36 and the cutter receiving portion 32 of the first and second fusing molds 31 and 35, with the corner tension part forming materials 221 being held therebetween along the outer peripheral edge of the core body 11. Protruding portions 222 of the corner tension forming materials 221 are then cut away, together with the protruding skin portions 18 protruding outwardly from the fused portions. The first and second skin materials 16 and 17 form the skin 15 covering the core body 11. At the same time, the corner tension part forming materials 221 form the corner tension parts 220. As a result, the sun visor main body 10 is formed.

Thus, in Embodiment 3 it is also possible to prevent the displacement of the corner fused parts 15a of the skin 15 toward the corner parts 11a of the core body 11 by means of the corner tension parts 220 in substantially the same manner as in Embodiment 1. This makes it possible to prevent the formation of wrinkles in the corner fused parts 15a of the skin 15 or in the vicinity thereof.

In particular, in Embodiment 3 there are arranged corner tension part forming materials 221 along the outer peripheral surface of the core body 11 at the portions corresponding to the corner parts 11a of the core body 11. Therefore, the embodiment is applicable to both the case in which the core body 11 is divided into the core split bodies 12 and 13 and the case in which the core body 11 is formed as an integral unit without being divided.

Embodiment 4

Next, Embodiment 4 of the present invention will be described with reference to FIGS. 12 and 13.

In Embodiment 4, there are corner tension part forming materials 321 arranged so as to abut the outer peripheral end surfaces of the core body 11. They are at the portions corresponding to the corner parts 11a of the core body 11. The corner tension part forming material 321 consist of sheet materials or plate materials formed of the same material as the material of the first and second skin materials 16 and 17, or a thermoplastic resin having compatibility with the material of the first and second skin materials 16.

Figure 12:
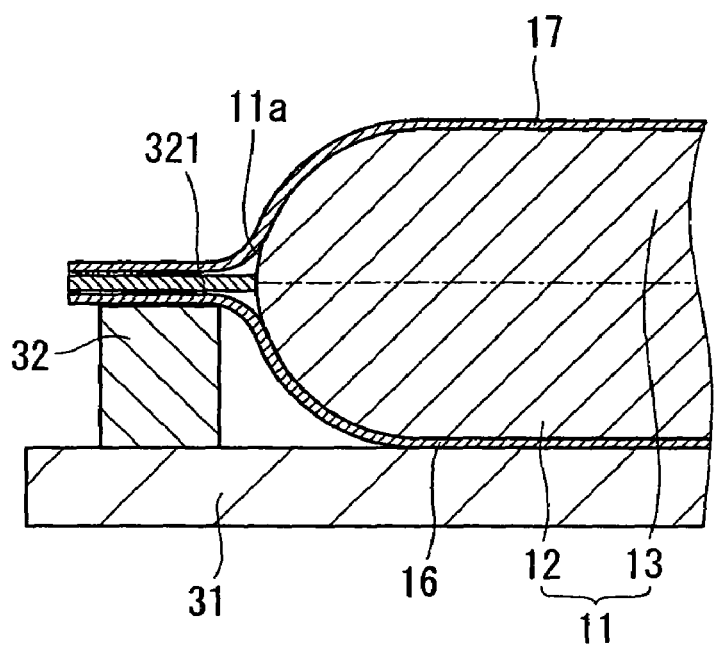
FIG. 12 is an explanatory view illustrating a method of manufacturing a sun visor for a vehicle according to Embodiment 4 of the present invention, showing how the first and second core split bodies, the first and second skin materials, and the corner tension part forming materials are set on the first fusing mold of the fusing mold device.

As shown in FIG. 12, the first skin material 16, the core body 11, the corner tension part forming materials 321, and the second skin material 17, are set on the mold surface of the first, lower fusing mold 31 of the first and second fusing molds 31 and 35 positioned in an open state. In this process, in order that there may be no positional deviation of the corner tension part forming materials 321 with respect to the outer peripheral end surfaces of the core body 11, it is desirable to temporarily fix the corner tension part forming materials 321 to the outer peripheral end surfaces of the core body 11 or the first skin material 16, or to secure the corner tension part forming materials 321 in position with set pins or the like of the first fusing mold 31.

Figure 13:
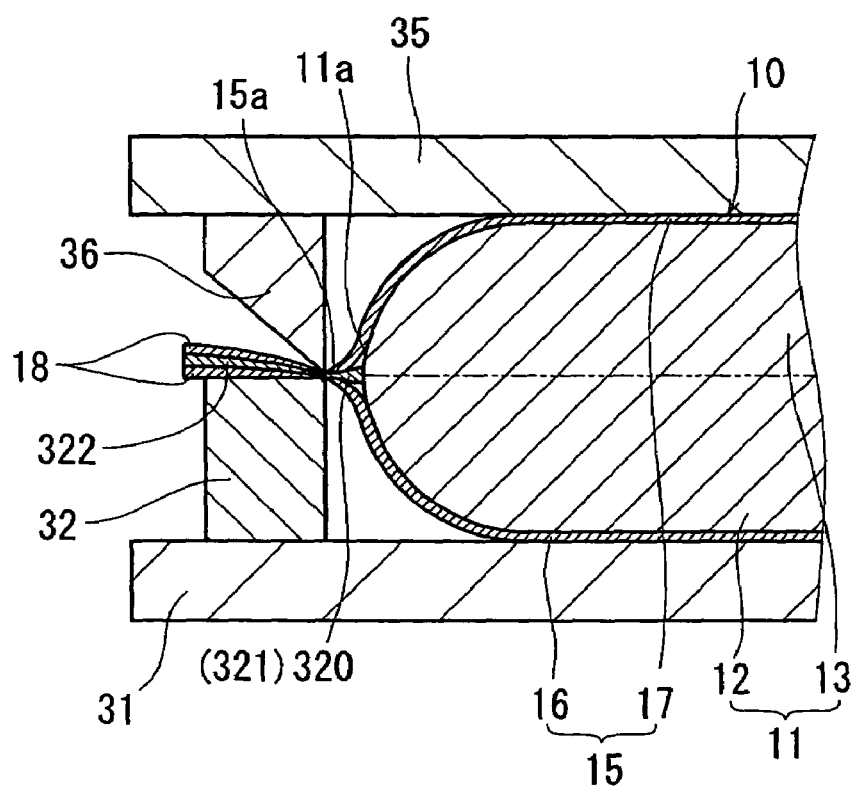

Thereafter, as shown in FIG. 13, the second fusing mold 35 is lowered with respect to the first fusing mold 31 in substantially the same manner as in Embodiment 1. As a result, the overlapping portions of the first and second skin materials 16 and 17 are fused to be bonded to each other by means of the fusing cutter 36 and the cutter receiving portion 32 of the first and second fusing molds 31 and 35. This occurs with the corner tension part forming materials 321 being held between the first and second skin materials 16 and 17 along the outer peripheral edge of the core body 11. The protruding portions 322 of the corner tension forming materials 321 are then cut away together with the protruding skin portions 18 protruding outwardly from the fused portions. The first and second skin materials 16 and 17 form the skin 15 covering the core body 11, and at the same time, the corner tension part forming materials 321 form the corner tension parts 320. As a result, the sun visor main body 10 is formed.

Thus, substantially in the same manner as in Embodiment 1 described above, in Embodiment 4 it is also possible to prevent the displacement of the corner fused parts 15a of the skin 15 toward the corner parts 11a of the core body 11 by means of the corner tension parts 320. This makes it possible to prevent the formation of wrinkles in the corner fused parts 15a of the skin 15 or in the vicinity thereof.

Further, substantially in the same manner as in Embodiment 3 described above, in Embodiment 4 the corner tension part forming materials 321 are also arranged so as to abut the outer peripheral end surfaces of the core body 11 at the portions corresponding to the corner parts 11a of the core body 11. As a result, the embodiment is applicable to both the case in which the core body 11 is divided into core split bodies 12 and 13 and the case in which the core 11 is formed as an integral unit without being divided.

Embodiment 5

Embodiment 5 of the present invention will be described with reference to FIGS. 14 through 16.

Figure 14:
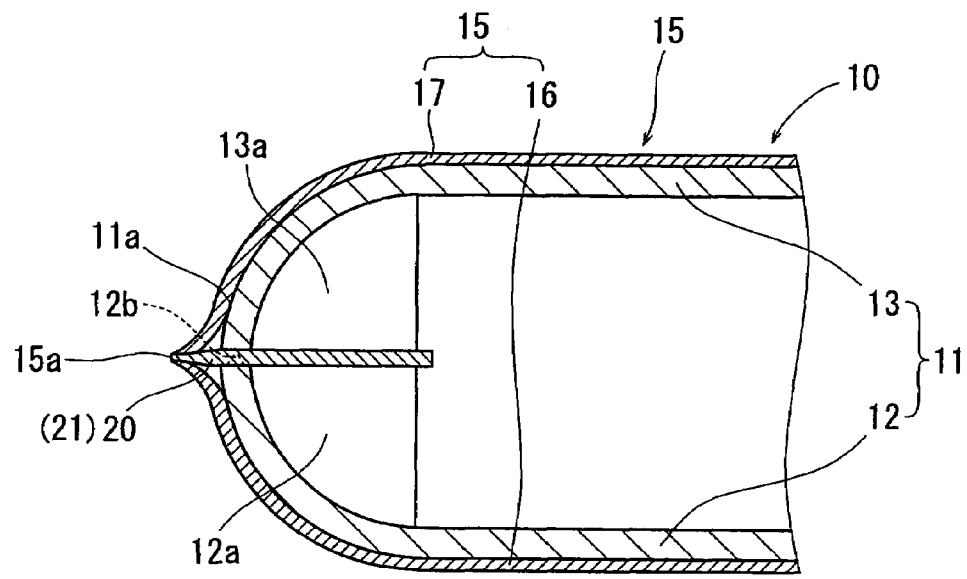
FIG. 14 is a cross-sectional view of a corner part of a sun visor for a vehicle manufactured by a method of manufacturing a sun visor for a vehicle according to Embodiment 5 of the present invention.

As shown in FIG. 14, in Embodiment 5 the first and second core split bodies 12 and 13, forming the core body 11, are formed as hollow, half-shell-shaped members by injection molding of a synthetic resin material.

Figure 15:
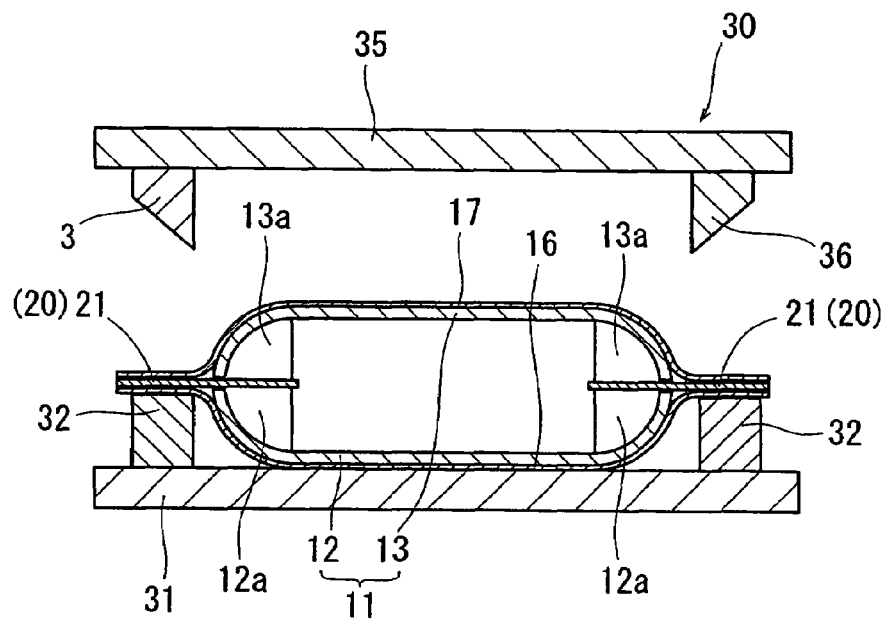
FIG. 15 is an explanatory view showing how the first and second core split bodies, the first and second skin materials, and the corner tension part forming materials, are set on the first fusing mold of the fusing mold device.

As further shown in FIG. 15, there protrude a plurality of ribs 12a and 13a to heights that are substantially the same as the heights of the split surfaces of the core split bodies 12 and 13. The plurality of ribs 12a and 13a are located at the corner portions of the inner wall portions of the first and second core split bodies 12 and 13 and in the vicinity thereof.

In addition, as shown in FIG. 15, integrally formed protrusions 12b (or 13b) may be arranged at appropriate intervals at portions of the split surface in the corner parts and in the vicinity of at least one of the first and second core split bodies 12 and 13, i.e., of the core split body 12 (or 13). The protrusions 12b (or 13b) are engaged with the corner tension part forming materials 21, which consist of sheet materials or plate materials of a thermoplastic resin.

Otherwise, this embodiment has substantially the same construction as in Embodiment 1 described above. The same components are indicated by the same reference symbols, and description thereof will be omitted.

Figure 16:
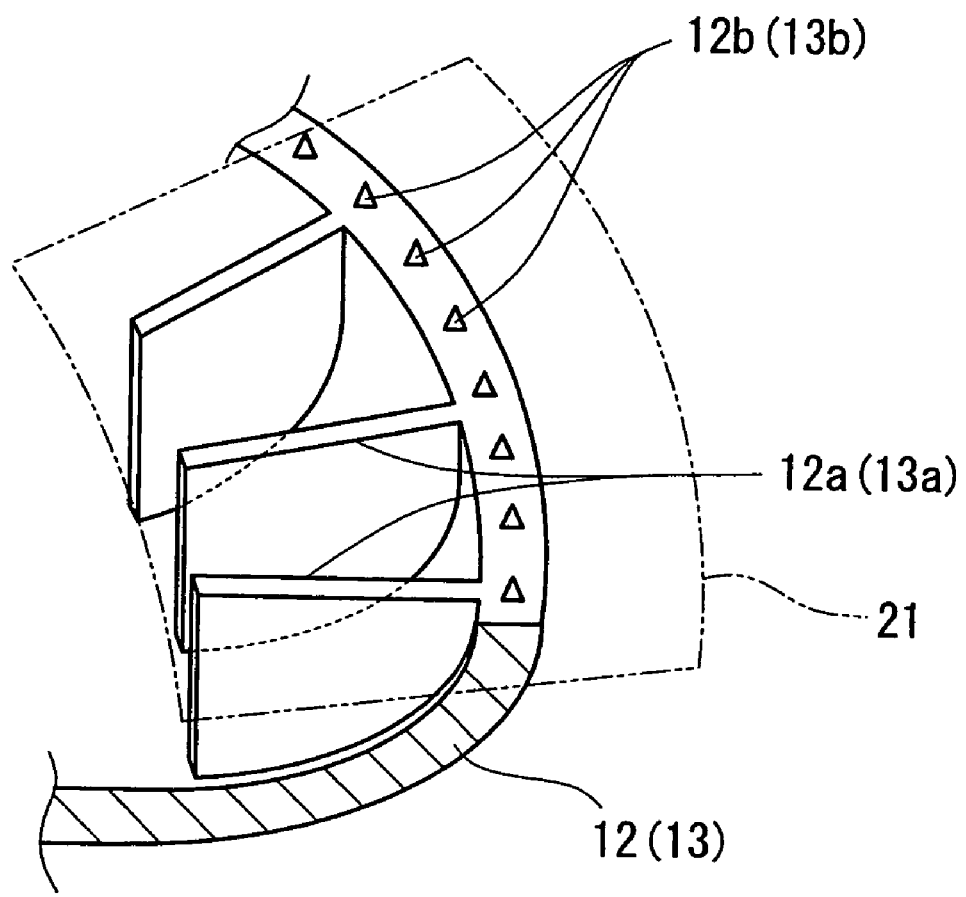
FIG. 16 is a perspective view of a corner section of a shell-shaped core split body.

Thus, as shown in FIG. 16, in Embodiment 5 the first skin material 16, the core body 11, the tension part forming materials 21, and the second skin material 17, are layered and set successively on the mold surface of the first fusing mold 31. Thereafter, the second fusing mold 35 is lowered with respect to the first fusing mold 31 in order to implement clamping. As a result, the first and second skin materials 16 and 17 form the skin 15 covering the core body 11, and the corner tension part forming materials 21 form the corner tension parts 20, thereby forming (manufacturing) the sun visor main body 10.

Substantially as in the same manner as in Embodiment 1 described above, in Embodiment 5 it is also possible to prevent displacement of the corner fused parts 15a of the skin 15 toward the corner parts 11a of the core body 11 by means of the corner tension parts 20. This makes it possible to prevent the formation of wrinkles in the corner fused parts 15a of the skin 15 or in the vicinity thereof.

In particular, in Embodiment 5 a plurality of protrusions 12b (or 13b) may be provided at portions of a split surface in the corner portions and in the vicinity thereof for at least one of the first and second core split bodies 12 and 13, i.e., of the core split body 12 (or 13). The protrusions 12b (or 13b) are engaged with the corner tension part forming materials 21. As a result, the engagement prevents inadvertent positional deviation of the corner tension part forming materials 21.

Consequently, it is possible to form the corner tension parts 20 by the corner tension part forming materials 21 in a satisfactory manner without involving any defects in formation. This proves greatly effective in preventing the formation of wrinkles in the corner parts of the skin 15.

The invention claimed is:

1. A sun visor for a vehicle comprising:
   a sun visor main body including a core body and a surface cover covering the core body;
   wherein the core body has at has at least one body corner; and
   wherein the surface cover has a corresponding cover corner opposing to the at least one body corner; and
   a corresponding corner strut member is disposed between the at least one body corner and the corresponding cover corner, so that the corresponding cover corner is urged away from the at least one body corner by the corresponding corner strut member.

2. The sun visor as in claim 1,
   wherein each of the corresponding corner strut members is bonded to the surface cover.

3. The sun visor as in claim 2,
   wherein each of the corresponding corner strut members has a first corner strut end and a
   second corner strut end opposite to the first corner strut end,
   the first corner strut end is bonded to the surface cover;
   the second corner strut end is engaged with the core body.

4. The sun visor as in claim 3,
wherein the core body comprises a first core body portion and a second core body portion coupled to each other to form the core body; and
wherein the second corner strut end of each of the corresponding corner strut members is engaged between the first core body portion and the second core body portion.

5. The sun visor as in claim 2,
wherein each of the corresponding corner strut members has a first corner strut end and a second corner strut end opposite to the first corner strut end,
the first corner strut end is bonded to the surface cover;
the second corner strut end is held between the core body and the surface cover.

6. The sun visor as in claim 1,
wherein each of the corresponding corner strut members is formed by a folded-over part of the surface cover.

* * * * *